June 25, 1940.  W. VAN NES  2,205,610
SAFETY CONTROL FOR AIRCRAFT
Filed May 7, 1938  3 Sheets-Sheet 1
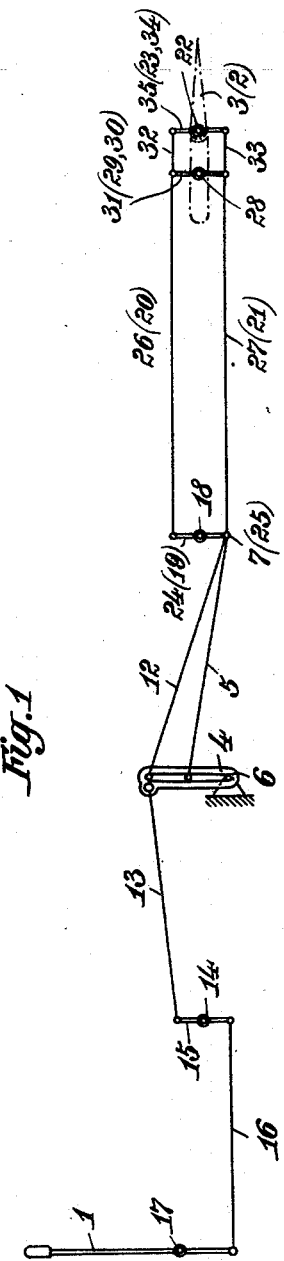
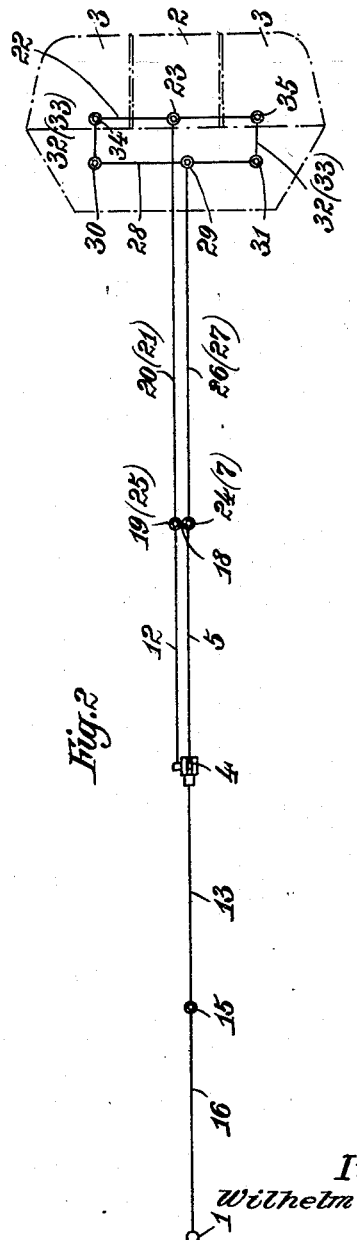
Inventor:
Wilhelm Van Nes,
Attorneys

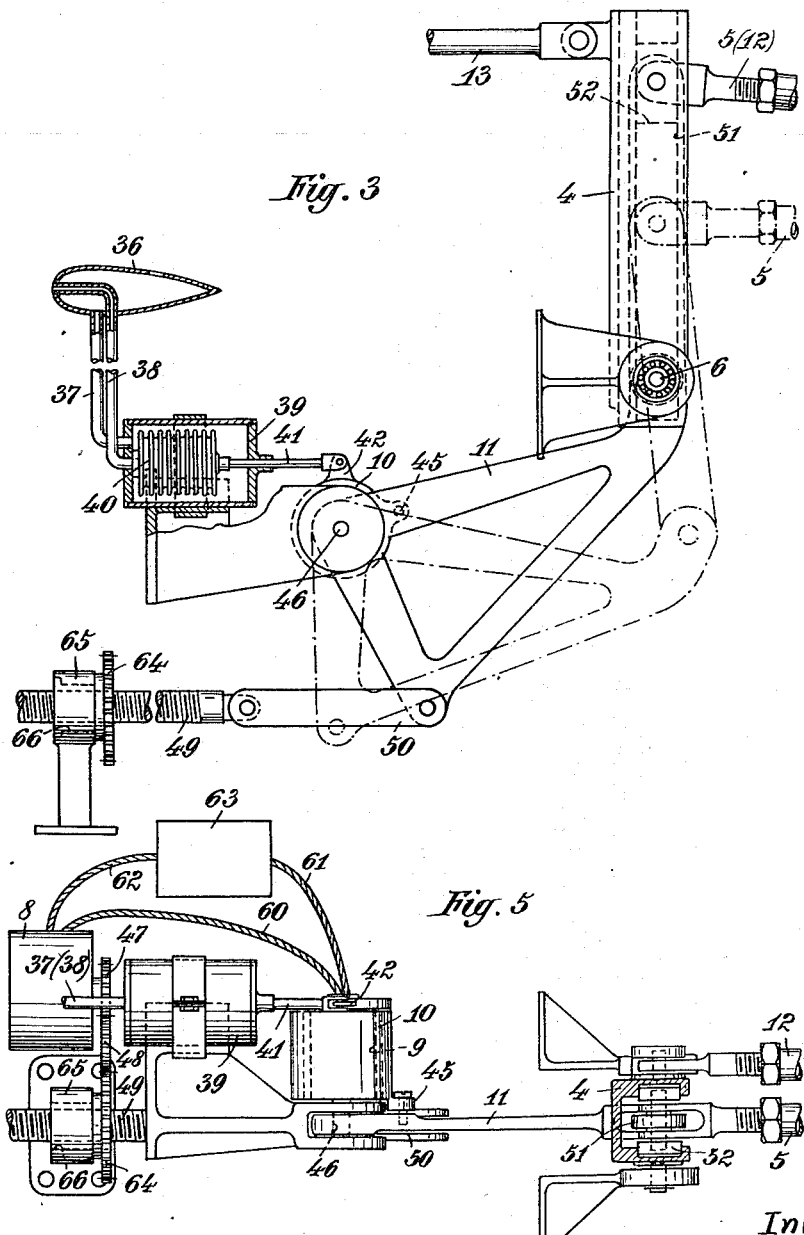

Inventor:
Wilhelm Van Nes,

Attorneys

Patented June 25, 1940

2,205,610

UNITED STATES PATENT OFFICE 2,205,610

SAFETY CONTROL FOR AIRCRAFT

Wilhelm van Nes, Brandenburg, Germany, assignor to Arado Flugzeugwerke Gesellschaft mit beschrankter Haftung, Brandenburg (Havel), Germany, a company of Germany Application May 7, 1938, Serial No. 206,648
In Germany June 7, 1937

7 Claims. (Cl. 244—83)

This invention relates to a safety control device for aircraft.

Underlying the invention is the problem of preventing excessive stresses of the aircraft which may be produced by harsh actuations of the control and permitting the pilot when flying at high speeds to exercise a fine sense of touch.

There have previously been proposed safety control devices in which an elastic member is interposed between the elevator and the control column or stick actuated by the pilot. The effect of such elastic member is that, on suddenly performed movements of the control column, the elevator does not immediately follow these movements. This action, which is desired with high speed flying, is undesired at low speed flying and conceals the danger that with fast control movements which may become necessary, as, for example, on rising from suddenly appearing obstacles or interception of obstacles on landing, the elevator action remains insufficient.

Further, there have been proposed safety control devices the essential features of which consist in this that in the control mechanism there are provided elastically chained members which are influenced by the acceleration on turning of the aircraft and thus automatically diminish the elevator action. These constructions are open to the objection that they are only practically effective when the turning of the aircraft has already been initiated and the permissible stress is already exceeded.

Further, there are known safety control devices in which the throw of the control column is limited by a stop which is displaced under the action of the dynamic pressure. These devices are not adapted for use when flying at very high speeds, as in such cases the freedom of movement of the control column is limited by the stop to so small a range that the pilot loses his sense of touch over the control movement.

By the present invention the drawbacks of the above mentioned safety control devices are avoided. namely, by reason that between the control column and the elevator there is interposed a linkage provided with a transmission variable by the dynamic pressure, which linkage in every position of the control column provides a rigid connection between the control column and the elevator and at all other dynamic pressures permits the maximum throw of the control column at the lowest dynamic pressure.

The improved safety control device presents further the advantage that it is particularly applicable to aircraft with a divided elevator consisting of elevator surfaces of different areas. In such aircraft there is permitted the actuation of the elevator which is characterised in that at very high speeds only the smaller elevator surface is adapted to be influenced by the pilot while the remaining part of the elevator remains at rest and only with diminishing dynamic pressure the said remaining part of the elevator comes automatically under the influence of the pilot. In this way an improved control of the elevator pressures which are experienced is possible and it becomes possible to cut down the elevator pressures in high speed flight.

An embodiment of the invention is illustrated by way of example in the accompanying drawings in which Fig. 1 shows diagrammatically the control device in conjunction with a divided elevator in side elevation.

Fig. 2 is a top plan view of Fig. 1.

Fig. 3 is a side elevation, partly in section, of an embodiment of the parts necessary for the safety control device.

Fig. 5 is a top plan of Fig. 3.

Figure 4:
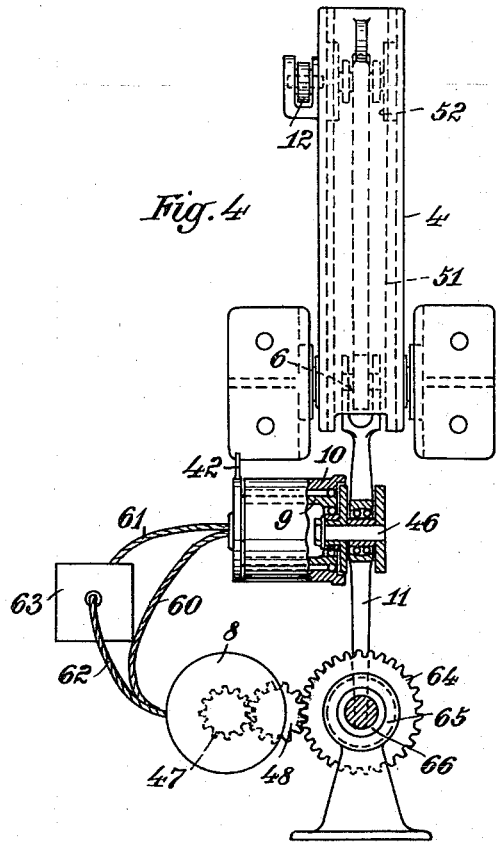
Fig. 4 is an elevation at right angles to Fig. 3, certain parts being omitted and certain parts being shown in section.

As shown in Figs. 1 and 2, a transmission member 4 is mounted for rocking movement about a fixed bearing 6. To the upper end of this member 4 are pivotally connected rods 12 and 13. The rod 13 is articulated by way of the lever 15 pivoted on the fulcrum 14 and by way of the rod 16 with the control column or stick 1 rockable about the axis 17. The rod 12 is connected to the lower end 25 of the lever 19 rockable about the axis 18. From the two ends of this lever 19 rods 20, 21 lead to the ends of the lever 23 rockable about the axis 22, which lever 23 in turn is rigidly connected with the smaller elevator surface 2 of the elevator. Further, there is shiftably arranged in the transmission member 4 one end of a rod 5 the other end of which is pivotally mounted in a bearing 7. The said bearing is provided at the lower end of a lever 24 which is rockable about the axis 18. The ends of the lever 24 are connected by way of the rods 26, 27 with the lever 29 rockable about the axis 28. On the axis 28 are mounted two levers 30 and 31 similar to the lever 29, the ends of which levers 30 and 31 are connected by way of rods 32 and 33 to two levers 34 and 35 similar to the lever 23 which levers 34 and 35 in turn are rigidly connected with the elevator surfaces 3.

Figure 6:
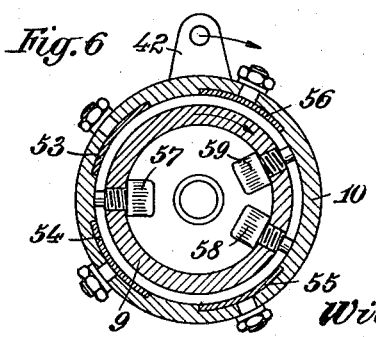
Fig. 6 is a section of a detail of Fig. 3.

In Figs. 3 to 6 the individual parts of the control device are designated as follows:

36 is the balance tube which is connected by way of the Pitot tube 37 for the static pressure and the tube 38 for the dynamic pressure with the casing 39 and with the expansion chamber 40, respectively. The chamber 40 is connected by way of the rod 41 to the lug 42 of a body 9 (Figs. 4 and 6) which is rotatable about the axis 46. Rotatably mounted on the body 9 is a body 10 having a lug 45 which is coupled with the triangular interponent 11. The interponent 11 is likewise rotatable about the axis 46. 8 (Fig. 5) is a shunt-wound motor on the shaft of which is fixedly mounted a toothed wheel 47 meshing with a toothed wheel 48 in mesh with a toothed wheel 64. The toothed wheel 64 is fixedly connected with a nut 66 running in a bearing 65 which nut is mounted on a spindle 49 and moves the latter in one or other longitudinal direction depending on the direction of rotation of the motor. The spindle is connected by way of a link 50 to the interponent 11. Also connected to the interponent 11 is an articulated member 51 to whose free end, which is shiftable by means of a slide block 52 in a guide of the member 4, is connected the rod 5. In its uppermost position, the rod 5 has the same inclination to the member 4 as the rod 12. This position and that of the interponent 12 are indicated in full lines, while the member 51 is represented by dash lines. As shown in Fig. 6 the body 10 has contact faces 53, 54, 55, 56, and the body 9 is provided with contact screws 57, 58 and 59. The contact faces and contact screws are connected by way of the strands of the cables 60, 61, 62 with the battery 63 and with the motor 8 in such wise that as soon as the bodies 9 and 10 are shifted in the manner described below, circuits are closed, namely, either a circuit I from the battery by way of the armature winding of the motor, the contact face 53 and contact screw 57, back to the battery and simultaneously therewith a circuit II from the battery by way of the exciting winding of the motor, contact face 55 and contact screw 58 back to the battery, or a circuit III from the battery by way of the armature winding of the motor, contact face 54 and contact screw 57 back to the battery and simultaneously therewith a circuit IV from the battery by way of the contact screw 59, contact face 56 and exciting winding of the motor back to the battery.

The mode of operation of the safety control device is as follows:

Let it be assumed in the first place that the aircraft equipped with the said device is in horizontal flight at normal speed. The several linkage members of the control device have the position relatively to one another represented in Fig. 1, but with the single difference that the rod 5 lies alongside the rod 12 so that it conceals the same in Fig. 1.

If the control column 1 is actuated, these movements are transmitted in such wise to the elevator surfaces 2 and 3 that the surface 2 performs the same angular movement as the surfaces 3 and these angular movements are proportional to those of the control column 1.

If, now, the flying speed is increased, the dynamic pressure increases and the following operations take place.

As will be seen from Fig. 3, by the pressure acting through the pipe 38 on the chamber 40 the latter is gradually expanded in longitudinal direction. With this expansion the rod 41 is displaced to the right and the lug 42 and the body 9 perform a rotary clockwise movement. As a result, as shown in Fig. 6, the contact screw 57 engages the contact face 53 and the contact screw 58 engages the contact face 55. Thereby the circuits I and II are closed and the motor 8 is switched on. The motor transmits the rotations by way of the toothed wheels 47 and 48 to the wheel 64 and so to the nut 66, so that the spindle 49 (Fig. 3) is moved to the left. With the aid of the link 50 the triangular interponent 11 is rocked about the axis 46 in clockwise direction, and by means of the link member 51 pulls the end of the rod 5 jointed thereto downwards. As, now, however, the interponent 11 is coupled with the lug 45 and thereby with the body 10, the body 10 performs a rotary movement in clockwise direction. As a result (Fig. 6) the body 10 follows up the body 9, because, as explained above, first by the expansion of the chamber 40 the rotation of the body 9 is effected, and then, after the circuits are closed, the movement of all the other members is discontinued. Bodies 9 and 10 thus constitute a so-called follow-up switch mechanism. While the above operations are taking place the dynamic pressure has attained a determined higher value and, as then the expansion chamber 40 no longer expands, the body 9 is brought to rest. At this moment, however, the contact screws 57 and 58 are still in engagement with the contact faces 53 and 55 and the body 10 therefore continues to turn until the said contact faces leave the contact screws. Now the interponent 11, the member 51 and the rod 5 have attained the position shown in Fig. 3 in chain-dotted lines.

Thereby the lever arm of the transmission member 4 rockable about the bearing 6 so far as comes into consideration for the transmission of the throw of this member to the rod 5 is made shorter. On the rocking of the member 4, therefore, the left hand end of the rod 5 has a smaller throw than the left hand end of the rod 12 and thus the movements of the control column 1 are transmitted to a less extent to the elevator surfaces 3 than to the elevator surfaces 2, so that the surfaces 3 have a smaller throw than the surface 2.

If now the dynamic pressure increases still further, the left hand end of the rod 5 is retracted further in the member 4 until finally the pivot point of this end may lie on the line of the axis of the bearing 6. In this position, naturally, the throw of the member 4 does not act on the rod 5, so that, with the maximum dynamic pressure, only the elevator surface 2 is controlled.

If the dynamic pressure falls then the chamber 40 collapses and the body 9 (Fig. 6) is turned in counterclockwise direction. At this time the contact screw 57 engages the contact face 54 and the contact screw 59 engages the contact face 56. In this way the circuits III and IV are closed and all the stages of operation proceed in the opposite direction of movement to that occasioned by the closing of the circuits I and II. The left hand end of the rod 5 is therefore moved upwardly until the dynamic pressure becomes constant.

The shift of the rod 5 is thus effected in dependence on the value of the dynamic pressure and effects together with the alteration effected by the shift of the lever arm engaging the rod a transmission of the throw of the control column relatively to those of the elevator surfaces 3.

The invention maintains a rigid connection between the control column and the control surfaces at all times. As the follow-up switch formed by the bodies 9 and 10 is self-checking in operation, the position of rod 5 is automatically changed and set for any change in dynamic pressure.

It is to be pointed out that the invention is not restricted as in the above described example to aircraft with a divided elevator but can also be applied to craft with an undivided elevator. In the latter case, the members of the linkage effecting the connection between the transmission member 4 and the elevator surface 2, would be omitted and the movements of the control column would be transmitted exclusively by way of the remaining links to the elevator.

What is claimed is:

1. In a control system for aircraft having a control member, a controllable surface, and adjustable rods connecting said member and surface, an apparatus for automatically adjusting said rods comprising means movable in response to changes in dynamic pressure, an electric switch operable in response to said movable means, an electric motor electrically connected to said switch, worm gear means connected to said motor, a member angularly displaceable by said worm gear means, and means controlled by said latter member for adjusting said rods with respect to each other.

2. In a system as in claim 1, said switch comprising two relatively displaceable elements, a plurality of contact points on said elements for successively making and breaking said electrical connecting means on relative displacement of said elements.

3. A control system for an aircraft having a control member and a surface to be controlled, comprising a first rod joined to said control member, a second rod adjustably joined to said first rod and connected to said control surface, motor means automatically operable in response to changes in dynamic pressure, worm means controlled by said motor means, and means movable by said worm means and connected to said second rod for adjusting said second rod with respect to said first rod whereby the degree in angular movement of said control member with respect to said control surface is varied upon changes in dynamic pressure.

4. In an aircraft control system, means for automatically varying the connection between a first element joined to a control member and a second element joined to a control surface comprising means responsive to changes in dynamic pressure, motor means, and self-checking means operable both by said motor means and said responsive means for shifting one of said elements with respect to the other.

5. In an aircraft control system, means for automatically varying the connection between a first element joined to a control member and a second element joined to a control surface comprising means responsive to changes in dynamic pressure, motor means for shifting one element with respect to the other, and follow-up switch means actuatable by said dynamic means and said motor means for effecting a shifting between said elements upon a change in dynamic pressure.

6. In an aircraft control system as in claim 5, said switch means comprising a first member having contact points and movable by said dynamic means, and a second member movably mounted with respect to said first member and having contacts and being actuatable by said motor means.

7. A control system for an aircraft comprising a control member and a control surface subdivided into two independently movable surfaces, a link having one end pivotally fixed to the aircraft, rod means for moving the free end of said link by said control member, means fixedly joining said link to one of said surfaces, means adjustably joining said link to the other of said surfaces, motor means for adjusting said adjustable means, means responsive to changes in dynamic pressure, and follow-up switch means interconnecting said dynamic means and said motor means.

WILHELM van NES.